United States Patent
Kim

(10) Patent No.: US 8,993,915 B2
(45) Date of Patent: Mar. 31, 2015

(54) SECTOR GEAR AND GAS-INSULATED SWITCHGEAR HAVING THE SAME

(75) Inventor: Hyung Choon Kim, Ulsan (KR)

(73) Assignee: Hyundai Heavy Industries Co., Ltd., Ulsan (KR)

( * ) Notice: Subject to any disclaimer, the term of this patent is extended or adjusted under 35 U.S.C. 154(b) by 225 days.

(21) Appl. No.: 13/591,342

(22) Filed: Aug. 22, 2012

(65) Prior Publication Data

US 2013/0167675 A1 Jul. 4, 2013

(30) Foreign Application Priority Data

Sep. 8, 2011 (KR) .................. 10-2011-0091225

(51) Int. Cl.
*H01H 3/40* (2006.01)
*F16H 19/04* (2006.01)
*H01H 31/00* (2006.01)
*H02B 13/035* (2006.01)

(52) U.S. Cl.
CPC ........... *F16H 19/04* (2013.01); *Y10T 74/18808* (2015.01); *H01H 3/40* (2013.01); *H01H 31/003* (2013.01); *H02B 13/035* (2013.01)
USPC ................. 218/78; 218/79; 218/80; 316/612; 74/89.17

(58) Field of Classification Search
CPC ....... F16H 19/04; F16H 21/10; F16H 37/122; H01H 2223/05; H01H 3/40
USPC ............. 74/89.17, 435, 439, 10.39, 130, 131, 74/134, 139, 422, 98, 99 R, 109, 112, 74/20–25, 29, 30, 33; 218/12, 45, 100, 55, 218/79; 439/103, 32; 310/20, 80; 335/228
See application file for complete search history.

(56) References Cited

U.S. PATENT DOCUMENTS

| | | | | |
|---|---|---|---|---|
| 954,987 | A * | 4/1910 | Morgan | 74/124 |
| 2,534,920 | A * | 12/1950 | Ludwig et al. | 218/112 |
| 2,539,213 | A * | 1/1951 | Von Mehren | 200/501 |
| 2,997,564 | A * | 8/1961 | Baker | 218/57 |
| 3,075,399 | A * | 1/1963 | Ham | 74/412 R |
| 3,143,622 | A * | 8/1964 | Fischer | 218/6 |
| 3,365,965 | A * | 1/1968 | French | 74/110 |
| 3,562,463 | A * | 2/1971 | Charbonneau et al. | 200/425 |
| 3,612,619 | A * | 10/1971 | Hayes | 303/8 |
| 3,756,088 | A * | 9/1973 | Inoue | 74/89.17 |
| 3,961,517 | A * | 6/1976 | DiMaio | 29/243.521 |

(Continued)

FOREIGN PATENT DOCUMENTS

KR 10-0990477 B1 10/2010

*Primary Examiner* — William Kelleher
*Assistant Examiner* — Valentin Craciun
(74) *Attorney, Agent, or Firm* — Sherr & Jiang, PLLC

(57) ABSTRACT

Provided is a sector gear including: a drive gear having a drive part that forms a part of a circle and has a plurality of teeth and a non-drive part that forms a remaining part of the circle and provides a non-contact angle of at least approximately 90 degrees; first and second movers forming a disconnector and a grounded breaking switch, respectively; and first and second driven gears engaged with the drive gear and respectively engaged with the first and second movers and configured to make the first mover or the second mover operate in conjunction with the drive part of the drive gear according to a direction of rotation of the drive gear, wherein an intermediate angle between the first and second movers is between approximately 90-135 degrees. The present invention can reduce the size of the gas-insulated switchgear having the sector gear.

4 Claims, 4 Drawing Sheets

(56) References Cited

U.S. PATENT DOCUMENTS

| | | | | |
|---|---|---|---|---|
| 4,258,580 A | * | 3/1981 | Lowe | 74/109 |
| 4,767,955 A | * | 8/1988 | McDaniel | 310/20 |
| 5,030,106 A | * | 7/1991 | Cameron et al. | 439/8 |
| 5,110,301 A | * | 5/1992 | Inoue et al. | 439/310 |
| 5,126,517 A | * | 6/1992 | Torres-Isea et al. | 218/117 |
| 5,828,025 A | * | 10/1998 | Neumaier et al. | 218/79 |
| 6,740,998 B2 | * | 5/2004 | Roy | 310/80 |
| 7,013,759 B1 | * | 3/2006 | Childress, II | 81/57.34 |
| 2011/0072925 A1 | * | 3/2011 | Ikeda | 74/412 R |

* cited by examiner

SECTOR GEAR AND GAS-INSULATED SWITCHGEAR HAVING THE SAME

CROSS-REFERENCE TO RELATED APPLICATIONS

This application claims foreign priority under 35 U.S.C. §119 to Korean Patent Application No. 10-2011-0091225 filed Sep. 8, 2011 with the Korean Intellectual Property Office, which is hereby incorporated by reference in its entirety.

BACKGROUND OF THE INVENTION

1. Field of the Invention

The present invention relates, in general, to a sector gear and, more particularly, to a sector gear that can reduce the size of a gas-insulated switchgear having the sector gear.

2. Description of the Related Art

Generally speaking, a gas-insulated switchgear (GIS) is an instrument that functions to intercept an electric current when a current accident occurs, and is formed by installing a circuit breaker, a disconnector, a grounded switchgear unit, an instrument current transformer, a bus bar, etc., in a grounded metal tank which contains sulfur hexafluoride ($SF_6$) gas having high insulating and arc-suppressing characteristics. A gas-insulated switchgear is the preferred type of switchgear for a power switchgear and is advantageous in that it can realize the small size of transforming stations, improves safety and operational reliability, is easy to operate, maintain and repair, and provides the desired environmental protection. Gas-insulated switchgears are configured in the form of two- and three-phase switches, and various gas-insulated switchgears have been developed which realize two- and three-phase switches that can be easily and safely operated and which can reduce the size of the space required to install the switchgear.

SUMMARY OF THE INVENTION

Accordingly, the present invention has been made keeping in mind the above problems occurring in the related art, and the present invention provides a sector gear that can reduce the size of a gas-insulated switchgear having the sector gear by forming an intermediate angle between movers of the sector gear.

In an embodiment, the present invention provides a sector gear, which includes: a drive gear including a drive part that forms a part of a circle and has a plurality of teeth, and a non-drive part that forms a remaining part of the circle and provides a non-contact angle of at least 90 degrees; first and second movers forming a disconnector and a grounded breaking switch, respectively; and first and second driven gears engaged with the drive gear and respectively engaged with the first and second movers and configured to make the first mover or the second mover operate in conjunction with the drive part of the drive gear according to a direction of rotation of the drive gear, wherein an intermediate angle between the first and second movers is between approximately 90-135 degrees.

In an embodiment, the first and second movers may include first and second rack gears, respectively, and the first and second rack gears may be engaged with the first and second driven gears, respectively.

In another embodiment, the present invention provides a gas-insulated switchgear having a sector gear, the sector gear including: a drive gear including a drive part that forms a part of a circle and has a plurality of teeth and a non-drive part that forms a remaining part of the circle and provides a non-contact angle of at least approximately 90 degrees; first and second movers forming a disconnector and a grounded breaking switch, respectively; and first and second driven gears engaged with the drive gear and respectively engaged with the first and second movers and configured to make the first mover or the second mover operate in conjunction with the drive part of the drive gear according to a direction of rotation of the drive gear, wherein an intermediate angle between the first and second movers is between approximately 90-135 degrees.

When the movers of the sector gear of the present invention are arranged in a state in which an angle θ is formed between the movers, the height of the gas-insulated switchgear can be reduced, so that the present invention is advantageous in that the structural size of the gas-insulated switchgear can be reduced, which can also reduce the manufacturing cost of the gas-insulated switchgear.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Since the descriptions of the disclosed technology have only been provided to describe embodiments whose purpose is to describe the structures and/or functions of the present invention, the scope of the rights of the disclosed technology should not be limited by the embodiments described herein. That is, the embodiments may be modified in various ways and, therefore, it should be understood that the scope of the rights of the disclosed technology may include equivalents which can implement the technical spirit of the present invention.

Meanwhile, the meanings of terms described herein should be construed as follows:

The terms "first" and "second" are only used to distinguish one element from another element, and the scope of the rights of the disclosed technology should not be limited by these terms. For example, a first element may be designated as a second element, and similarly a second element may be designated as the first element.

When it is described that one element is "connected" or "coupled" to another element, the one element may be directly connected or coupled to the other element, but an intervening element may exist therebetween. On the other hand, when it is described that one element is "directly connected" or "directly coupled" to another element, it should be understood that no element exists therebetween. Meanwhile, other expressions which describe the relationships between elements, that is, "between ~" and "directly between ~" or "adjacent to ~" and "directly adjacent to ~," should be interpreted in the same way.

It should be understood that a singular expression may include a plural expression, as long as the context of the expressions is not obviously different. In this application, the meaning of "include" or "have" are intended to specify a property, a fixed number, a step, a process, an element, a component, and/or a combination thereof but are not intended to exclude the presence or addition of other properties, fixed numbers, steps, processes, elements, components, and/or combinations.

All the terms used herein have the same meanings as terms that are generally understood by those having ordinary knowledge in the art to which the disclosed technology pertains, as long as the terms are defined differently. It should be understood that the definitions of the terms found in commonly-used dictionaries coincide with those of terms in the related technology. As long as the terms are not explicitly defined in the present application, they are not ideally or excessively analyzed as having a formal meaning.

Figure 1:
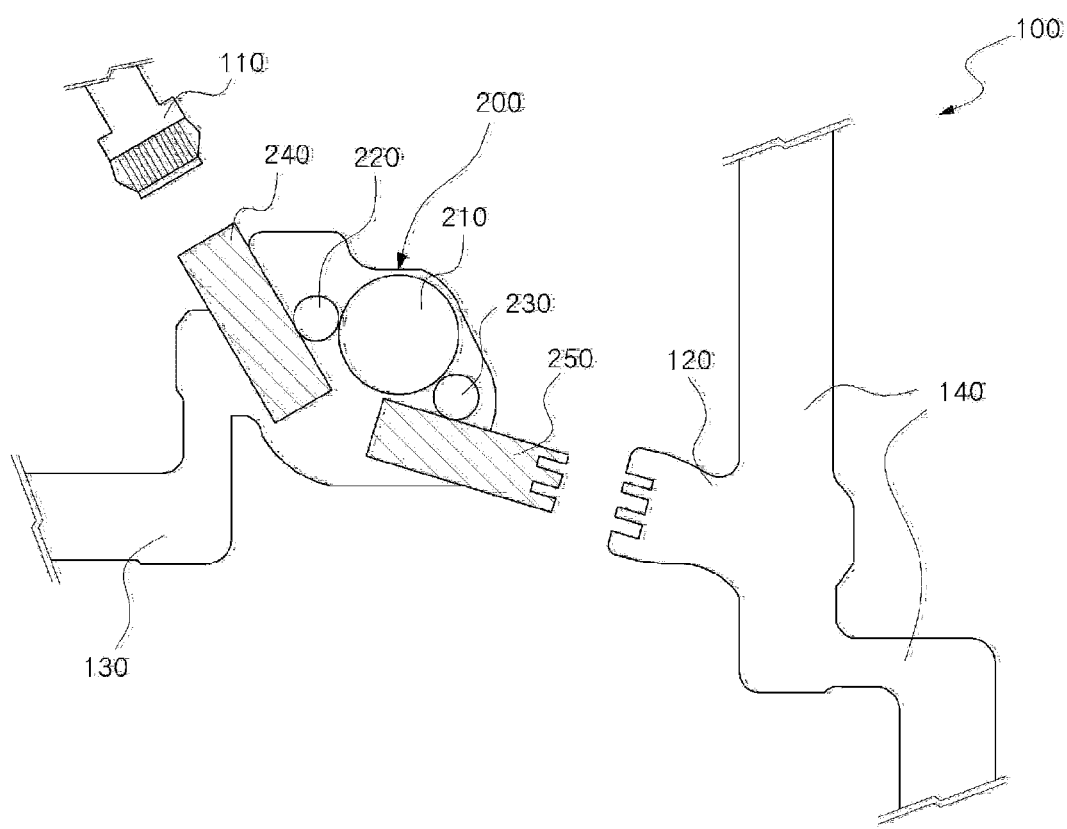
FIG. 1 is a view illustrating a gas-insulated switchgear according to an embodiment of the present invention.

FIG. 1 is a view illustrating a gas-insulated switchgear according to an embodiment of the present invention.

As shown in FIG. 1, the gas-insulated switchgear 100 includes a grounded breaking switch 110, a disconnector 120 and a sector gear 200.

The grounded breaking switch 110 is installed in the gas-insulated switchgear 100 and can direct a residual electric current remaining in an electric wire of a system to the ground when a current accident occurs, thereby allowing a user to check and repair the system.

The disconnector 120 is installed in the gas-insulated switchgear 100 and may be connected to a main line 140 and can interrupt an electric circuit so as to change the contact of the circuit.

The sector gear 200 may be connected to a bus bar 130 and includes a drive gear 210, first and second driven gears 220 and 230 and first and second movers 240 and 250. The sector gear 200 that is connected to the bus bar 130 can direct the electric current flowing in the bus bar to the grounded breaking switch 110 or to the disconnector 120.

Figure 2:
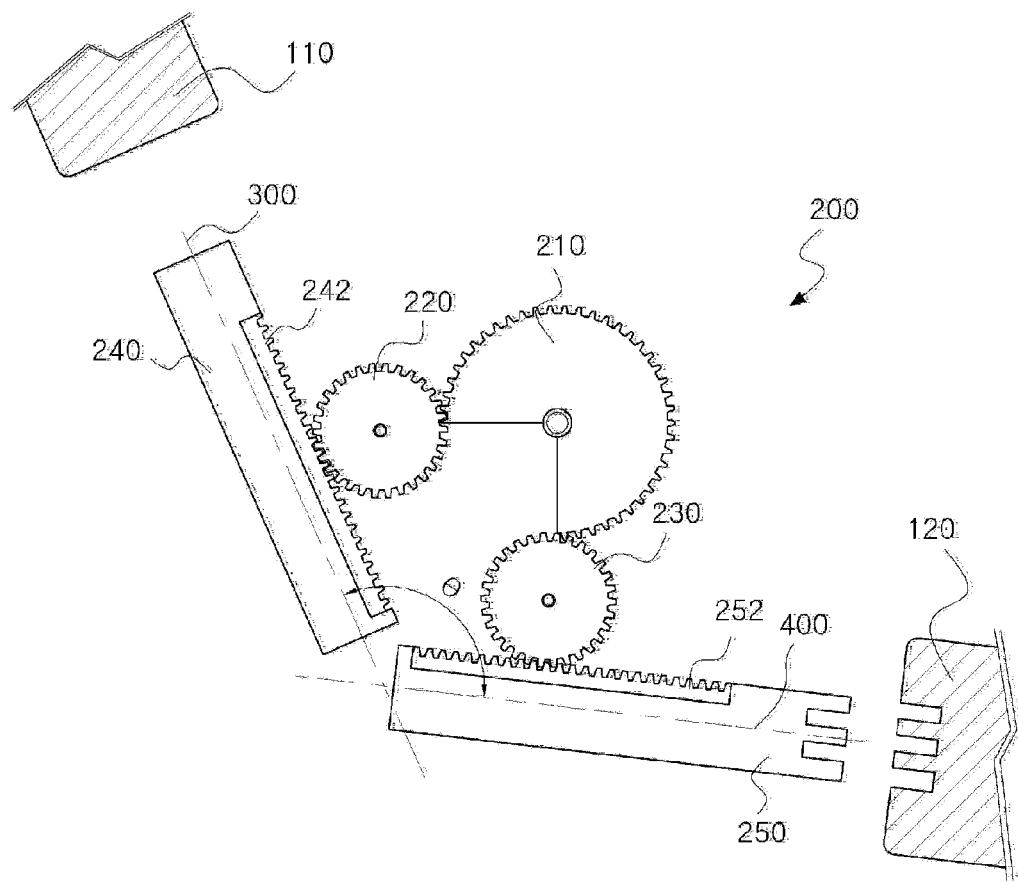
FIGS. 2 through 4 are views illustrating the operation of the sector gear shown in FIG. 1.
Figure 3:
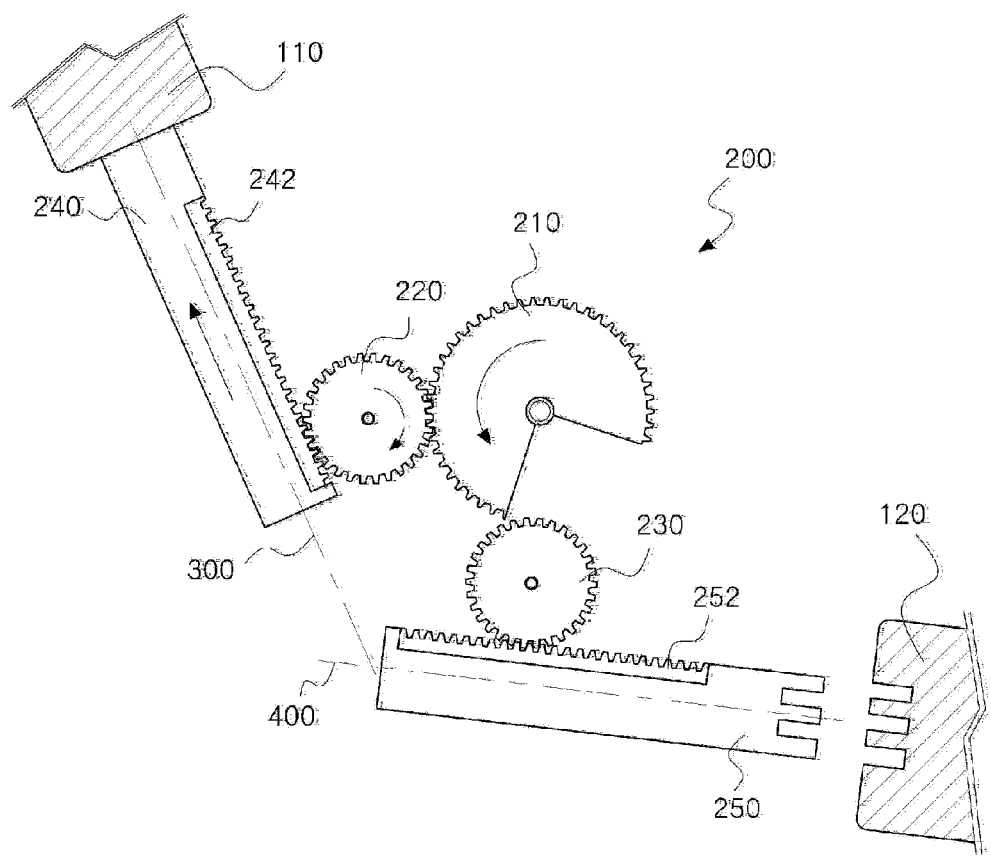
Figure 4:
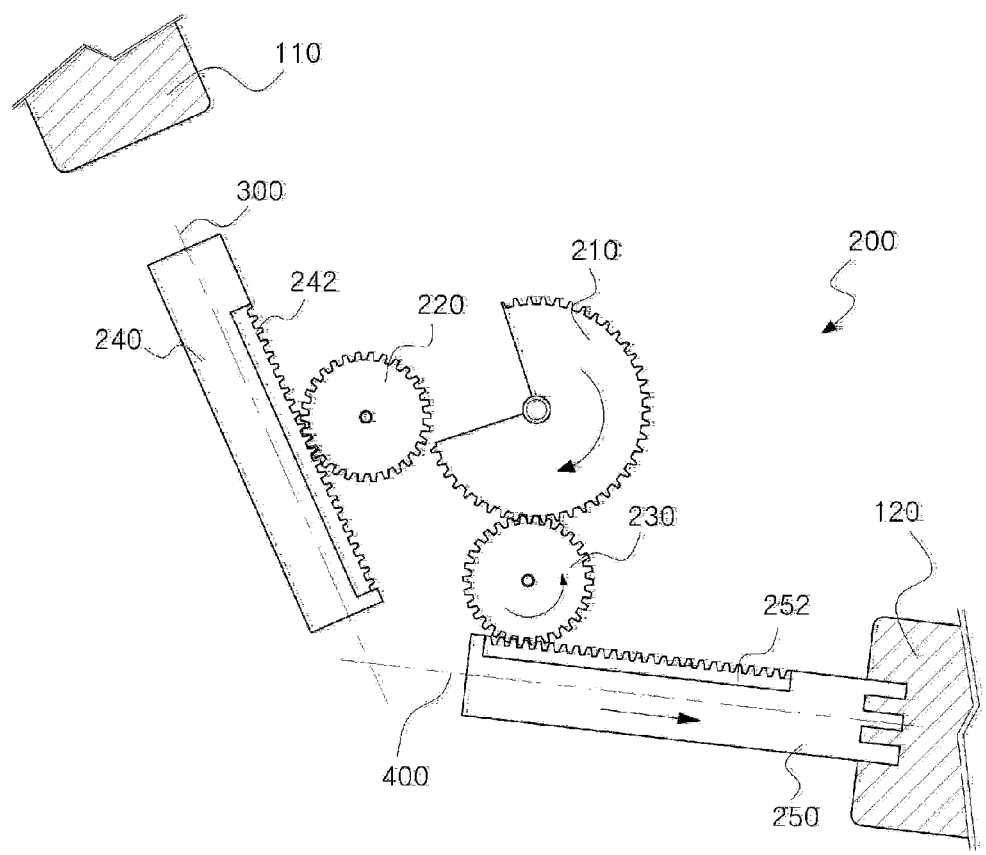

FIGS. 2 through 4 are views illustrating the operation of the sector gear shown in FIG. 1.

As shown in FIGS. 2 through 4, the sector gear 200 includes the drive gear 210, the first and second driven gears 220 and 230, and the first and second movers 240 and 250.

The drive gear 210 is configured to have a drive part and a non-drive part. The drive part forms a part of a circle and includes a plurality of teeth, and the non-drive part forms a remaining part of the circle and has a non-contact angle of at least 90 degrees. In an embodiment, the drive gear 210 may be coupled to a rotating shaft and can be rotated in opposite directions by power provided from the outside.

Each of the first and second driven gears 220 and 230 includes a plurality of teeth that form a circle and may engage with the drive gear 210. In an embodiment, the first and second driven gears 220 and 230 may be rotated in opposite directions by the rotatory motion of the drive gear 210. The first and second driven gears 220 and 230 may be engaged with respective rotating shafts and may be rotated by the rotatory motion of the drive gear 210 in directions opposite to a direction of rotation of the drive gear 210. In the above state, the first and second driven gears 220 and 230 may rotate in the same direction.

The first and second movers 240 and 250 include respective rack gears, i.e. first and second rack gears 242 and 252. The first and second rack gears 242 and 252 are engaged with the first and second driven gears 220 and 230, respectively, so that when the first and second driven gears 220 and 230 rotate in opposite directions, the first and second movers 240 and 250 that have the first and second rack gears 242 and 252 engaged with the first and second driven gears 220 and 230 can perform respective reciprocating motions along respective linear axes 300 and 400.

In an embodiment, the first and second driven gears 220 and 230 can make the first and second movers 240 and 250 operate in conjunction with the drive gear 210, so that the rotatory motion of the drive gear 210 can control the reciprocating motions of the first and second movers 240 and 250. When the first mover 240 or the second mover 250 reciprocates, the first mover 240 may be put into contact with the grounded breaking switch 110 or the second mover 250 may be put into contact with the disconnector 120. In the above state, when one of the movers is put into contact with the grounded breaking switch 110, the other mover may be in a non-contact state in which the mover is separated from the disconnector 120.

In an embodiment, when the first mover 240 makes contact with the grounded breaking switch 110, the gas-insulated switchgear 100 can be put into the grounded state. When the second mover 250 makes contact with the disconnector 120, the gas-insulated switchgear 100 may be put into the disconnected state.

In an embodiment, the linear axis 300 of the first mover 240 may form an angle θ, which exceeds 90 degrees but is not greater than 135 degrees, relative to the linear axis 400 of the second mover 250 (that is, an intermediate angle between the axes 300 and 400). The angle θ may assume various values within a range that does not interfere with the mechanical motions of the first and second movers 240 and 250.

The present invention disclosed above has the following advantages; however, it should be understood that the following description of the advantages does not mean that a specified embodiment must have all of the advantages or must have only the specified advantages, so that the right of the invention disclosed above is not limited by the advantages.

When the sector gear according to the embodiment of the present invention is installed in the gas-insulated switchgear and the movers of the sector gear are arranged in a state in which the angle θ is formed between the movers, the height of the gas-insulated switchgear can be reduced, so that the structural size of the gas-insulated switchgear can be reduced, which can also reduce the manufacturing cost of the gas-insulated switchgear.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A driving gearing for a gas-insulated switchgear, comprising:
 a first mover linearly reciprocatable along a first linear axis being slanted with respect to a vertical axis;
 a ground breaking switch arranged along the first linear axis being slanted with respect to the vertical axis and contactable to the first mover;
 a second mover linearly reciprocatable along a second linear axis being slanted with respect to a horizontal axis, wherein the second linear axis intersects the first linear axis with an internal angle exceeding 90 degrees and less than 135 degrees, wherein the second mover has a first uneven end surface;
 a disconnector extended from a main line of the gas-insulated switchgear along the second linear axis being slated with respect to the horizontal axis and having a second uneven end surface which is contactable with the first uneven surface of the second mover;

a first driven gear mated with and driving the first mover;
a second driven gear mated with and driving the second mover; and
a sector gear mated with the first and second driven gears and including i) a driving part having teeth formed on a part of a circumference of the sector gear and ii) a non-driving space having no tooth and occupying a remaining part of the circumference of the sector gear, the occupied remaining part being at least greater than one quarter of a whole circumference of the sector gear,
wherein the sector gear drives the first and second movers at the same time while the driving part is mated with the first and second driven gears, the sector gear drives one of the first and second movers alone while only one of the first and second driven gears is mated with the driving part, wherein the sector gear does not contact with the other one of the first and second driven gears when the driving part is mated with only one of the first and second driven gears.

2. The sector gear as set forth in claim 1, wherein the first mover includes a first linear rack gear mated with the first driven gear and the second mover includes a second linear rack gear mated with the second driven gear.

3. A gas-insulated switchgear having a driving gearing, the driving gearing comprising:
a first mover linearly reciprocatable along a first linear axis being slanted with respect to a vertical axis;
a ground breaking switch arranged along the first linear axis being slanted with respect to the vertical axis and contactable to the first mover;
a second mover linearly reciprocatable along a second linear axis being slated with respect to a horizontal axis, wherein the second linear axis intersects the first linear axis with an internal angle exceeding 90 degrees and less than 135 degrees, wherein the second mover has a first uneven end surface;
a disconnector extended from a main line of the gas-insulated switchgear along the second linear axis being slated with respect to the horizontal axis and having a second uneven end surface which is contactable with the first uneven surface of the second mover;
a first driven gear mated with and driving the first mover;
a second driven gear mated with and driving the second mover; and
a sector gear mated with the first and second driven gears and including i) a driving part having teeth formed on a part of a circumference of the sector gear and ii) a non-driving space having no tooth and occupying a remaining part of the circumference of the sector gear, the occupied remaining part being at least greater than one quarter of a whole circumference of the sector gear,
wherein the sector gear drives the first and second movers at the same time while the driving part is mated with the first and second driven gears, the sector gear drives one of the first and second movers alone while only one of the first and second driven gears is mated with the driving part, wherein the sector gear does not contact with the other one of the first and second driven gears when the driving part is mated with only one of the first and second driven gears.

4. The gas-insulated switchgear of claim 3, wherein the first mover includes a first linear rack gear mated with the first driven gear and the second mover includes a second linear rack gear mated with the second driven gear.

* * * * *